United States Patent
Yasuda et al.

(10) Patent No.: US 7,826,324 B2
(45) Date of Patent: *Nov. 2, 2010

(54) DATA PLAYBACK METHOD AND DEVICE FOR DATA RECORDED AS A HOLOGRAM

(75) Inventors: Shin Yasuda, Ashigarakami-gun (JP); Yasuhiro Ogasawara, Ashigarakami-gun (JP); Jiro Minabe, Ashigarakami-gun (JP); Katsunori Kawano, Ashigarakami-gun (JP); Koichi Haga, Ashigarakami-gun (JP); Kazuhiro Hayashi, Ashigarakami-gun (JP); Hisae Yoshizawa, Ashigarakami-gun (JP); Makoto Furuki, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 948 days.

This patent is subject to a terminal disclaimer.

(21) Appl. No.: 11/482,166

(22) Filed: Jul. 7, 2006

(65) Prior Publication Data
US 2007/0147801 A1    Jun. 28, 2007

(30) Foreign Application Priority Data
Dec. 26, 2005    (JP) .............................. 2005-373529

(51) Int. Cl.
*G11B 7/00* (2006.01)
*G03H 1/16* (2006.01)
(52) U.S. Cl. .............................. 369/103; 359/10; 359/29
(58) Field of Classification Search ............... 359/1–35; 365/125, 216, 235; 369/103
See application file for complete search history.

(56) References Cited

U.S. PATENT DOCUMENTS 4,971,409 A * 11/1990 Yeh et al. ........................ 359/7

(Continued)

FOREIGN PATENT DOCUMENTS

EP    1 511 017 A2    3/2005

(Continued)

OTHER PUBLICATIONS

Yasua et al.; "Optical Noise Reduction by Reconstructing Positive and Negative Images from Fourier Holograms in Coaxial Holographic Storage Systems;" *Optics Letters, OSA, Optical Society of America*; Washington, DC, US; vol. 31, No. 11; Jun. 1, 2006; pp. 1639-1641.

(Continued)

*Primary Examiner*—Wayne R Young
*Assistant Examiner*—Nathan A Danielsen
(74) *Attorney, Agent, or Firm*—Oliff & Berridge, PLC

(57) ABSTRACT

There is provided a data playback method including: acquiring first image data by illuminating reference light for reading onto an optical recording medium on which a hologram has been recorded by Fourier transforming and simultaneously illuminating reference light and signal light expressing digital data as a light-and-dark image, and detecting an inverse Fourier-transform image of diffracted light which is diffracted by the recorded hologram; acquiring second image data, which is a reversal image of the first image data, by generating combined light by combining the diffracted light and a dc component whose phase is different than a phase of a dc component of the signal light included in the diffracted light, and detecting an inverse Fourier-transform image of the combined light; and computing a difference in luminance for each pixel of the light-and-dark image, by carrying out computing processing by using the first and second image data.

14 Claims, 7 Drawing Sheets

U.S. PATENT DOCUMENTS

| | | | |
|---|---|---|---|
| 5,488,494 | A | 1/1996 | Redfield et al. |
| 6,762,865 | B1 | 7/2004 | Edwards |
| 6,809,845 | B1 | 10/2004 | Kim et al. |
| 7,262,892 | B1 * | 8/2007 | Yasuda et al. ............... 369/103 |
| 7,511,867 | B2 * | 3/2009 | Yasuda et al. ................. 359/29 |
| 2001/0007592 | A1 | 7/2001 | Pu et al. |
| 2005/0134948 | A1 | 6/2005 | Waldman et al. |
| 2006/0152783 | A1 | 7/2006 | Butler et al. |

FOREIGN PATENT DOCUMENTS

| | | |
|---|---|---|
| JP | A-10-340479 | 12/1998 |
| JP | A-2000-066565 | 3/2000 |
| JP | A-2000-066566 | 3/2000 |
| JP | A-2004-198816 | 7/2004 |
| WO | WO 99/31531 A2 | 6/1999 |

OTHER PUBLICATIONS

Horimai et al., "Collinear Holography;" Applied Optics; Optical Society of America; vol. 44; No. 13; May 1, 2005; pp. 2575-2579.

Yasuda et al.; "Optical Noise Reduction by Reconstructing Positive and Negative Images from Fourier Holograms in Coaxial Holographic Storage Systems;" Optics Letter; Optical Society of America; vol. 31; No. 11; Jun. 1, 2006; pp. 1639-1641.

Aug. 6, 2008 Office Action issued in U.S. Appl. No. 11/527,577.

Jan. 28, 2009 Notice of Allowance issued in U.S. Appl. No. 11/527,577.

Jun. 18, 2007 Notice of Allowance issued in U.S. Appl. No. 11/633,058.

* cited by examiner

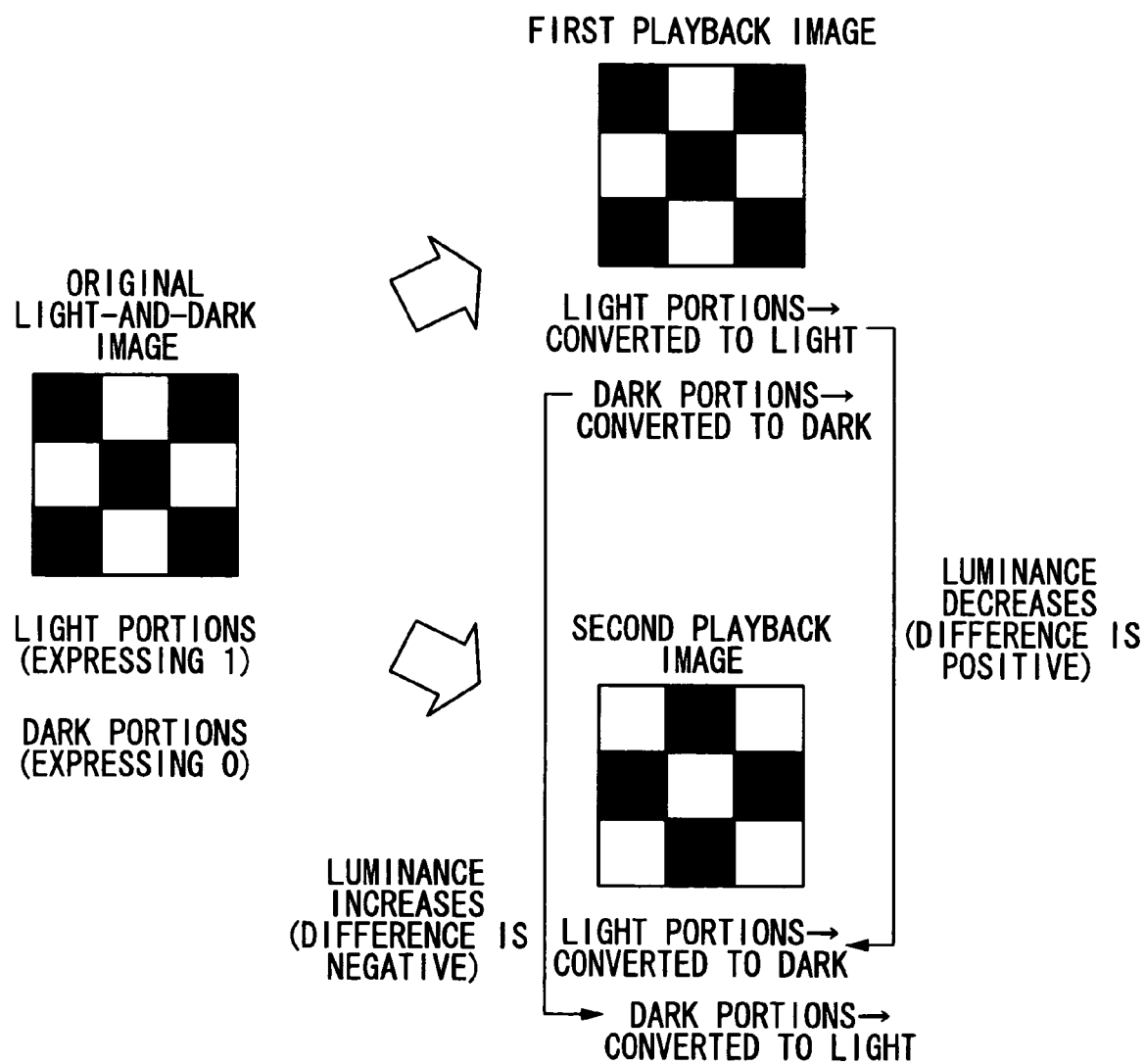

PATTERN OF SLM

DATA PLAYBACK METHOD AND DEVICE FOR DATA RECORDED AS A HOLOGRAM

BACKGROUND

1. Technical Field

The present invention relates to a data playback method and device, and in particular, to a data playback method and device which, in a case in which digital data is recorded as a Fourier transform hologram, accurately play-back the recorded digital data.

2. Related Art

In holographic data storage, digital data "0, 1" is made into a digital image (signal light) as "light, dark", and the signal light is Fourier transformed by a lens and is illuminated onto an optical recording medium. A Fourier transform image is recorded on the optical recording medium as a hologram. In order to realize high recording density, the multiplicity must be increased, and the amount of data per page (page data amount) must be made to be large. However, when the multiplicity and the page data amount are increased, there are the problems that effects such as crosstalk noise, scattering, and the like increase, and the S/N (signal-noise ratio) of the hologram playback image greatly decreases.

SUMMARY

An aspect of the present invention provides a data playback method including: acquiring first image data by illuminating reference light for reading onto an optical recording medium on which a hologram has been recorded by Fourier transforming and simultaneously illuminating reference light and signal light expressing digital data as a light-and-dark image, and detecting an inverse Fourier transform image of diffracted light which is diffracted by the recorded hologram; acquiring second image data, which is a reversal image of the first image data, by generating combined light by combining the diffracted light and a dc component whose phase is different than a phase of a dc component of the signal light included in the diffracted light, and detecting an inverse Fourier transform image of the combined light; and computing a difference in luminance for each pixel of the light-and-dark image, by carrying out computing processing by using the first image data and the second image data.

BRIEF DESCRIPTION OF THE DRAWINGS

Embodiments of the present invention will be described in detail based on the following figures, wherein:

FIG. 1 is a diagram for explaining principles of decoding digital data;

DETAILED DESCRIPTION

Figure 2A:
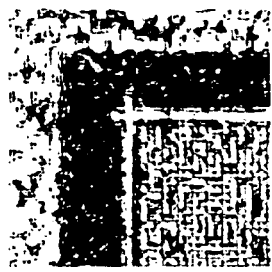
FIG. 2A is a graph showing result of a computer experiment.

Examples of embodiments of the present invention will be described in detail hereinafter with reference to the drawings.

(Principles of Decoding Digital Data)

FIG. 1 is a diagram for explaining the principles of decoding digital data.

Here, description will be given of a case in which signal light (a digital pattern), in which digital data "0, 1" are made into a digital image as "dark (black pixel), light (white pixel)", is Fourier transformed, and the Fourier transformed signal light and reference light are illuminated simultaneously onto an optical recording medium, and the interference pattern is recorded as a hologram.

The diffracted light obtained from the hologram plays-back the original signal light. Namely, the light portions of the original light-and-dark image become light, and the dark portions become dark, and the inverse Fourier transform image of the diffracted light (first playback image) is a light-and-dark positive image which is similar to the original signal light. On the other hand, in a case in which an opposite-phase dc component is combined with the diffracted light from the hologram, the light portions of the original light-and-dark image become dark and the dark portions become light, and the inverse Fourier transform image of the combined light (second playback image) is a reversal image (negative image) in which the light-and-dark of the original signal light are reversed.

In this case, the difference at the time when the luminance of the second playback image is subtracted from the luminance of the first playback image is positive at the light portions of the original light-and-dark image, and is negative at the dark portions of the original light-and-dark image. As mentioned previously, if the digital data "0, 1" is defined as "dark (black pixel), light (white pixel)" for example, the code of each pixel can be accurately judged in accordance with the positive/negative sign of the difference and the digital data can be played-back accurately, such that pixels whose difference is positive are "1" and pixels whose difference is negative are "0".

Examples of the section which computes the difference in luminance are methods such as subtraction processing, and the like.

The aforementioned two examples describe examples in which the luminance of the second playback image is subtracted from the luminance of the first playback image. However, conversely, similar decoding processing can be carried out even if the luminance of the first playback image is subtracted from the luminance of the second playback image. Further, by subtracting the luminance of the second playback image from the luminance of the first playback image, the newly generated image can be used in decoding processing.

Because the image generated by this subtraction processing has a better S/N (signal-noise ratio) than the aforementioned two types of playback images, the digital data can be decoded precisely regardless of the coding method.

Playback of the negative image (second playback image) is realized as a result of the interference between the diffracted light from the hologram and the added dc component. Namely, in a case in which the diffracted light and the dc component are opposite phases, a negative image can be obtained by setting the phase difference and the amplitude of the dc component to be added, such that the negative amplitude of the dc component of the combined light increases.

Setting of the phase of the dc component can be carried out by appropriately changing the luminance of the pixels for signal light of the spatial light modulator. The spatial light modulator modulates and emits polarized light of incident light. The polarization-modulation is carried out by phase-modulating the incident light. Namely, the phase can be modulated by polarization-modulation. Further, the magnitude of the polarization-modulation depends on the luminance of the image displayed at the spatial light modulator. Accordingly, by setting the luminance of this image, the phase of the dc component can be set.

Next, a method of setting the phase difference between the diffracted light from the hologram and the dc component will be described.

The phase of the diffracted light from a recorded hologram is offset from the phase of the reference light at the time of playback. The extent of the variation in the phase depends on the type of the hologram. For example, in a hologram in accordance with refractive index modulation or a hologram in accordance with absorptance modulation, the phase of the diffracted light is offset by $\pi/2$, $\pi$, respectively. Accordingly, in order to generate a playback image, it suffices to set the luminance of the image displayed on the spatial light modulator while taking this phase shift into consideration, and to generate a dc component and add it to the diffracted light. The desired phase difference can thereby be realized.

First Example Embodiment

Figure 3:
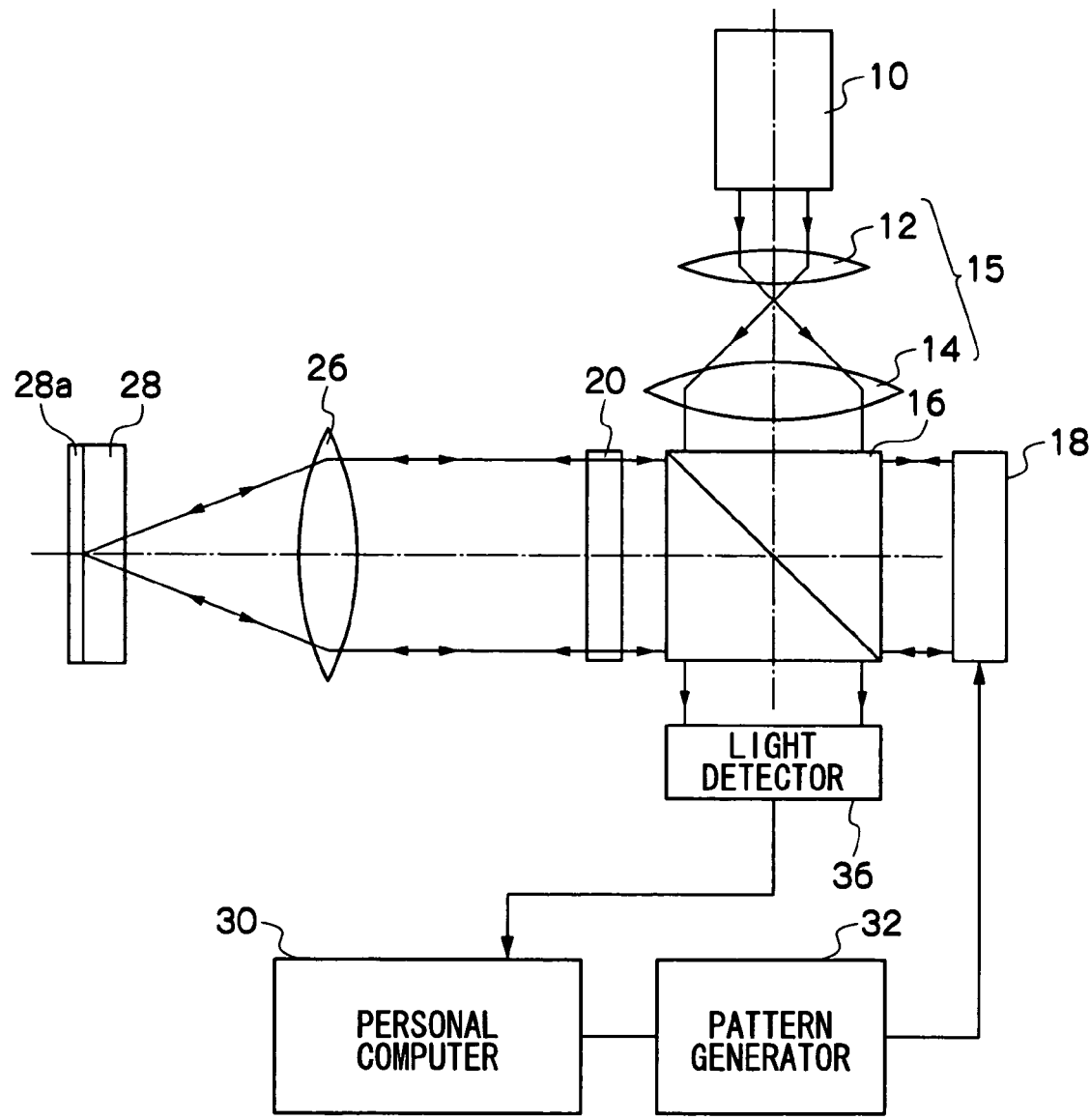
FIG. 3 is a diagram showing the schematic structure of a hologram recording/playback device relating to a first embodiment.

FIG. 3 is a diagram showing the schematic structure of a hologram recording/playback device relating to a first embodiment. As shown in FIG. 3, in the recording/playback device, signal light and reference light can be coaxially illuminated onto an optical recording medium.

A light source 10, which oscillates laser light which is S-polarized coherent light, is provided in the hologram recording/playback device. A beam expander 15 formed from lenses 12, 14 is disposed at the laser light illuminating side of the light source 10. A polarization beam splitter 16, which transmits only polarized light of a predetermined direction and reflects other polarized light, is disposed at the light transmitting side of the beam expander 15. Hereinafter, explanation will be given with the polarization beam splitter 16 transmitting P-polarized light and reflecting S-polarized light.

A reflecting-type spatial light modulator 18 is disposed at the light reflecting side of the polarization beam splitter 16. The spatial light modulator 18 is connected to a personal computer 30 via a pattern generator 32. In accordance with digital data supplied from the personal computer 30, the pattern generator 32 generates a pattern to be displayed on the spatial light modulator 18. The spatial light modulator 18 modulates incident laser light in accordance with the displayed pattern, and generates reference light and a digital image (signal light) per page. The generated signal light and reference light are reflected in the direction of the polarization beam splitter 16, and are transmitted through the polarization beam splitter 16.

A quarter-wave plate 20 and a Fourier transform lens 26 are disposed in that order along the optical path at the signal light transmitting side of the polarization beam splitter 16. The quarter-wave plate 20 converts linearly polarized light into circularly polarized light, or converts circularly polarized light into linearly polarized light.

At the time of hologram playback, when the reference light is illuminated onto an optical recording medium 28, the illuminated reference light is diffracted by the hologram, and the diffracted light is reflected, by a reflecting layer 28a of the optical recording medium 28, in the direction of the Fourier transform lens 26. The diffracted light which is reflected is incident on the polarization beam splitter 16. A light detector 36, which is structured by an image pickup element such as a CCD or a CMOS array or the like and which converts received playback light (diffracted light) into electric signals and outputs the electric signals, is disposed at the diffracted light reflecting side of the polarization beam splitter 16. The light detector 36 is connected to the personal computer 30.

Figure 4:
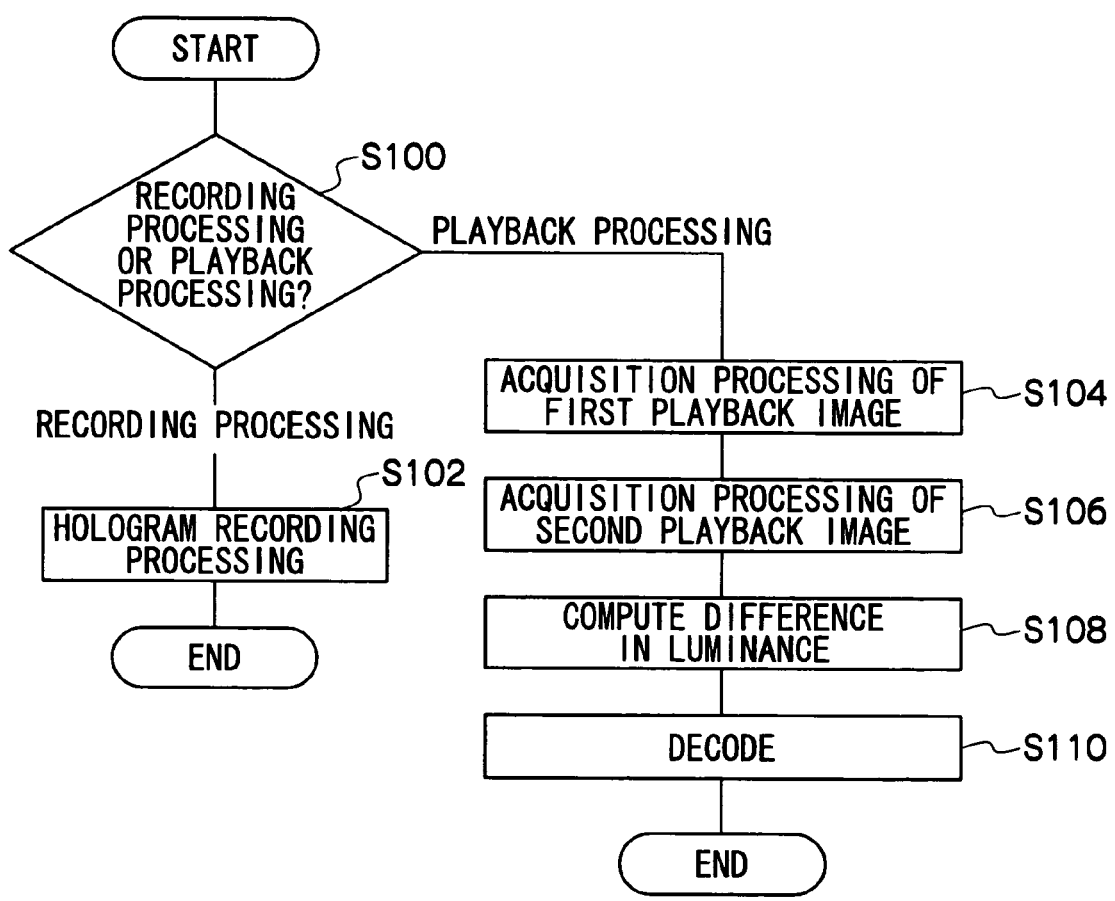
FIG. 4 is a flowchart showing a processing routine of recording/playback processing.

Next, a processing routine of recording/playback processing, which is executed by the personal computer 30, will be described. FIG. 4 is a flowchart showing the processing routine of recording/playback processing. First, a user operates an input device (not shown) and selects either recording processing or playback processing. When digital data is to be recorded as a hologram, the digital data to be recorded is input in advance to the personal computer.

In step 100, it is judged whether recording processing has been selected or playback processing has been selected. If recording processing has been selected, in step 102, laser light is illuminated from the light source 10, the digital data is output at a predetermined timing from the personal computer 30 and recording processing of a hologram is executed, and then the routine ends.

Here, the recording processing of a hologram will be described.

The laser light oscillated from the light source 10 is collimated into a large-diameter beam by the beam expander 15, is incident on the polarization beam splitter 16, and is reflected in the direction of the spatial light modulator 18. When digital data is inputted from the personal computer 30, at the pattern generator 32, a signal light pattern is generated in accordance with the supplied digital data, and is combined with a reference light pattern such that a pattern to be displayed on the spatial light modulator 18 is generated. At the spatial light modulator 18, the laser light is polarization-modulated in accordance with the displayed pattern, and signal light and reference light are generated.

Figure 5:
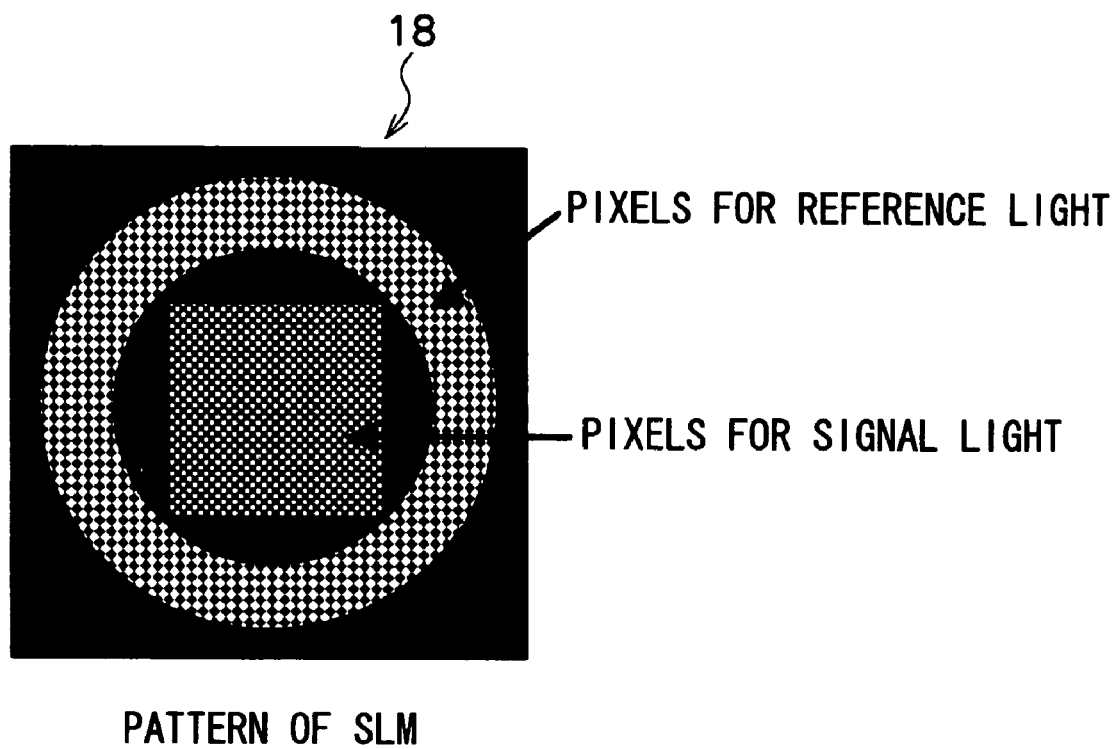
FIG. 5 is a diagram showing a display image of a spatial light modulator.

For example, as shown in FIG. 5, the central portion of the spatial light modulator 18 is used for data display (i.e., for signal light), and the peripheral portion of the spatial light modulator 18 is used for reference light. The laser light incident on the central portion of the spatial light modulator 18 is polarization-modulated in accordance with the displayed pattern, and signal light is generated. On the other hand, the laser light incident on the peripheral portion of the spatial light modulator 18 is polarization-modulated in accordance with the displayed pattern, and reference light is generated.

The signal light and the reference light which are polarization-modulated at the spatial light modulator 18 are illuminated onto the polarization beam splitter 16, and are transmitted through the polarization beam splitter 16 and converted into an amplitude distribution of linearly polarized light. Thereafter, they are converted into circularly polarized light at the quarter-wave plate 20, Fourier transformed by the lens 26, and are illuminated onto the optical recording medium 28 simultaneously and coaxially. In this way, the signal light and the reference light interfere within the optical recording medium 28, and the interference pattern is recorded as a hologram.

In the present embodiment, the two types of playback images, which are the first playback image and the second playback image, are acquired, and digital data is played-back by using these playback images. Accordingly, if playback processing is selected in step 100 of FIG. 4, in step 104, acquisition processing of the first playback image is started. Namely, laser light is illuminated from the light source 10, and acquisition processing of the first playback image is executed.

The acquisition processing of the first playback image will be described here.

Figure 6A:
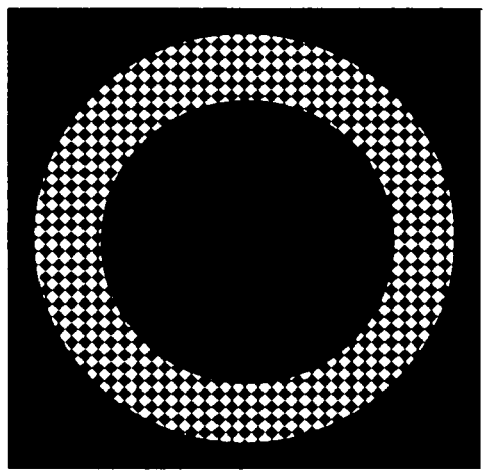
FIG. 6A is a diagram showing a display image of a spatial light modulator in a case in which a first playback image is acquired.

As shown in FIG. 6A, a light-blocking pattern (the entirety of which is black pixels) is displayed at the central portion of the spatial light modulator 18, and a reference light pattern, which is the same as at the time of recording, is displayed at the peripheral portion of the spatial light modulator 18. In this way, only the laser light incident on the peripheral portion of the spatial light modulator 18 is polarization-modulated, and reference light is generated. The reference light passes through the polarization beam splitter 16, and is converted into an amplitude distribution. Thereafter, only the reference light is, via the quarter-wave plate 20 and the lens 26, illuminated onto the region of the optical recording medium 28 where the hologram is recorded.

The illuminated reference light is diffracted by the hologram, and the diffracted light is reflected in the direction of the lens 26 at the reflecting layer 28a of the optical recording medium 28. The diffracted light which is reflected is inverse Fourier transformed by the lens 26, is converted into S-polarized light at the quarter-wave plate 20, is incident on the polarization beam splitter 16, and is reflected in the direction of the light detector 36. The playback image can be observed at the focal plane of the lens 26.

This playback image (first playback image) is detected by the light detector 36. The detected analog data is A/D converted by the light detector 36, and the image data of the first playback image is inputted to the personal computer 30 and held in a RAM (not shown). The first playback image is a positive image which is the same as the original light-and-dark image.

Next, in step 106, a luminance value of the display image, which is for adding the dc component to the played-back diffracted light, is computed. Laser light is illuminated from the light source 10 and the computed luminance value is outputted from the personal computer 30 at a predetermined timing, and acquisition processing of the second playback image is carried out.

The acquisition processing of the second playback image will be described here.

As mentioned previously, playback of a negative image (the second playback image) is realized as a result of interference between the diffracted light from the hologram and the added dc component. Namely, in a case in which the dc component of the diffracted light and the dc component to be added are mutually opposite phases, a negative image can be obtained by setting the phase difference and the amplitude of the dc component to be added such that the negative amplitude of the dc component of the combined light increases. The setting of the phase and the amplitude of the dc component can be carried out by appropriately changing the luminance of the pixels for signal light of the spatial light modulator.

In the present embodiment, description will be given of a case in which the phase of the dc component to be added is the opposite phase of the phase of the diffracted light from the hologram. In this case, in the inverse Fourier transform image of the combined light (the second playback image), the light portions of the original light-and-dark image become dark, and the dark portions become light. Namely, the second playback image is a negative image in which the light and dark of the original light-and-dark image are reversed.

Figure 6B:
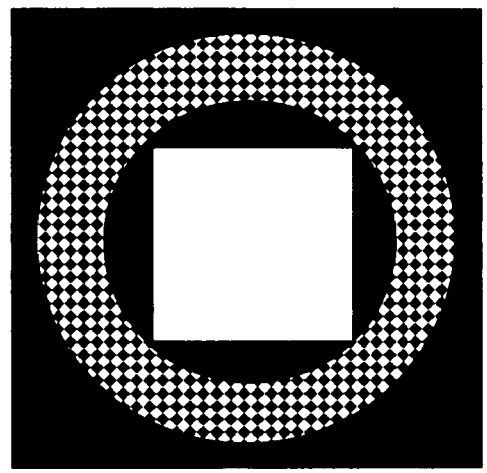
FIG. 6B is a diagram showing a display image of the spatial light modulator in a case in which a second playback image is acquired.

As shown in FIG. 6B, a transmission pattern (pixels of the same luminance other than those whose luminance is 0) is displayed at the central portion of the spatial light modulator 18, and a reference light pattern, which is the same as at the time of recording, is displayed at the peripheral portion of the spatial light modulator 18. In this way, the laser light incident on the central portion of the spatial light modulator 18 is polarization-modulated, and a dc component of the signal light is generated. Moreover, the laser light incident on the peripheral portion of the spatial light modulator 18 is polarization-modulated in accordance with the displayed pattern, and reference light is generated. After being transmitted through the polarization beam splitter 16 and converted into an amplitude distribution, the generated reference light and dc component of the signal light are illuminated, via the quarter-wave plate 20 and the lens 26, onto the region of the optical recording medium 28 where the hologram is recorded.

The computing of the luminance value of the transmission pattern is carried out by the following procedures.

Given that, at the inverse Fourier transform plane (the position of the light detector 36), the amplitude of the dc component of the diffracted light from the hologram is A1, the amplitude of the dc component added at the time of playback is A2, and the aforementioned phase difference between the added dc component and the dc component of the diffracted light is $\Delta\phi$, an electric field E1 of the dc component of the diffracted light and an electric field E2 of the added dc component are expressed by the following formulas.

$$E1 = A1 \exp[i(kz)]$$

$$E2 = A2 \exp[i(kz+\Delta\phi)]$$

In the formulas, k is the optical axis direction wave number, z is the optical axis direction coordinate, $\Delta\phi$ is the phase difference between the added dc component and the dc component of the diffracted light, and i is an imaginary number unit.

At this time, the electric field of the dc component of the combined wave is E1+E2.

$$E1+E2 = \{A1 + A2\exp(i\Delta\phi)\}\exp[i(kz)]$$

In order to obtain the second playback image which is a negative image, it suffices for the real part of the amplitude of E1+E2 to be negative. Namely, it suffices to satisfy following formula (1). Moreover, because the minimum value of cos($\Delta\phi$) is −1, following formula (2) must be satisfied in order to satisfy the above formulas.

$$A1 + A2\cos(\Delta\phi) < 0 \qquad \text{formula (1)}$$

$$A1 < A2 \qquad \text{formula (2)}$$

Because the diffraction efficiency of the hologram is usually set to be substantially constant by a recording scheduling method, the value of A1 is known. Accordingly, setting A2 and $\Delta\phi$ satisfies above formula (1) and formula (2). Desirably, $\Delta\phi = \pi$ and A2=2A1.

The luminance value of the transmission pattern (pixels of the same luminance other than those whose luminance is 0) displayed at the central portion of the spatial light modulator 18 can be set as follows for example. Namely, in a spatial light modulator which can modulate the phase such as a liquid crystal panel, the amplitude A2 and the phase $\Delta\phi$ of the transmitted light of the polarization beam splitter 16 are modulated simultaneously in accordance with the luminance value. Because the amplitude of the dc component included in the diffracted light from the hologram is known, the luminance value of the transmission pattern can be set such that the left side of above formula (1) becomes a value which is as small as possible.

The reference light illuminated onto the optical recording medium 28 is diffracted by the hologram, and the diffracted light is reflected in the direction of the lens 26 by the reflecting layer 28a of the optical recording medium 28. Further, the dc component of the signal light illuminated on the optical recording medium 28 is reflected in the direction of the lens 26 by the reflecting layer 28a of the optical recording medium 28. The diffracted light and the dc component of the signal light which are reflected are inverse Fourier transformed by the lens 26, are converted into S-polarized light at the quarter-wave plate 20, are incident on the polarization beam splitter 16, and are reflected in the direction of the light detector 36. The playback image can be observed at the focal plane of the lens 26.

This playback image (second playback image) is detected by the light detector 36. The detected analog data is A/D converted by the light detector 36, and the image data of the second playback image is inputted to the personal computer 30 and held in the RAM (not shown).

When acquisition processing of the second playback image is finished, the routine moves on to subsequent step 108. The image data of the first playback image and the image data of the second playback image, which are held in the RAM, are read-out, the image data of the second playback image is subtracted from the image data of the first playback image, and the difference in luminance is computed for each pixel of the digital image (signal light).

In the inverse Fourier transform image of the combined light (the second playback image), the light portions of the original light-and-dark image become dark and the dark portions become light, such that a reversal image (negative image) of the original light-and-dark image is obtained. Accordingly, the difference, at the time when the luminance of the second playback image is subtracted from the luminance of the first playback image, is positive at the light portions of the original light-and-dark image and is negative at the dark portions of the original light-and-dark image. Because the second playback image is a reversal image of the first playback image, in the image after the subtraction processing, the contrast is enhanced more than in the first playback image and the second playback image. Namely, the code of each pixel can be judged accurately from the positive/negative sign of the computed difference, and the digital data can be played-back accurately.

Note that, in a case in which one pixel of the data for the signal light corresponds to plural pixels of the light detector 36, the difference of the average values of the differences of the luminances is computed for the plural pixels of the light detector 36.

Next, in step 110, the code of each pixel is judged from the positive/negative sign of the computed difference, the digital data is decoded, and the routine ends. In this way, the digital data held by the signal light can be decoded accurately.

As described above, in the present embodiment, a positive image is acquired from diffracted light diffracted by a recorded hologram, a negative image is acquired from combined light which combines the dc component of the Fourier transform image of the signal light with this diffracted light, and the image data of the negative image is subtracted from the image data of the positive image. Therefore, in the image after the subtracting processing, the contrast is enhanced more than in the positive image and the negative image. Accordingly, if the difference in luminance is computed for each pixel of the light-and-dark image by subtracting processing, the positive/negative sign of the difference is clear, the code of each pixel can be accurately judged from the positive/negative sign of the computed difference, and the digital data can be played-back accurately.

Further, because the noise included in the image data is cancelled in the difference computing process, the digital data can be played-back accurately.

Moreover, in accordance with the above-described coding method, one bit can be expressed by one pixel. Therefore, high recording density can be realized.

In addition, the image after the subtracting processing can also be applied to methods other than the above-described coding method, by utilizing the advantages thereof that the noise is cancelled and the contrast is improved.

Second Example Embodiment

Figure 7:
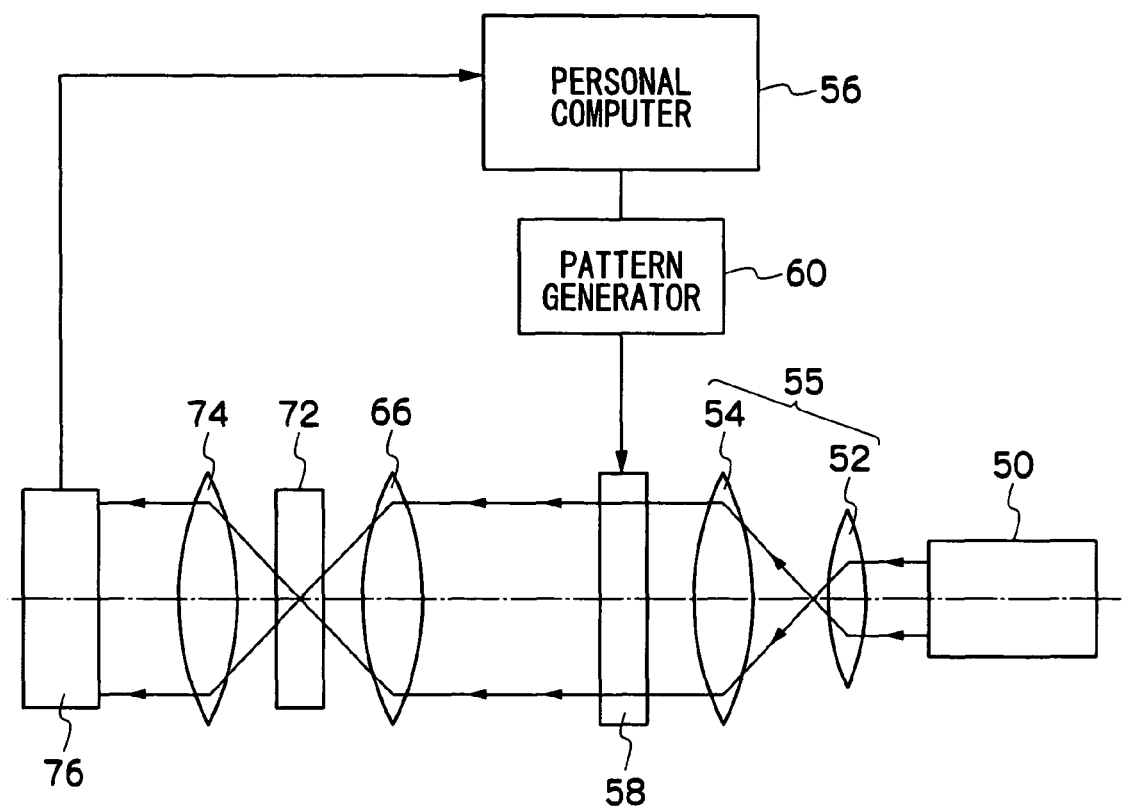
FIG. 7 is a diagram showing the schematic structure of a hologram recording/playback device relating to a second embodiment.

FIG. 7 is a diagram showing the schematic structure of a hologram recording/playback device relating to a second embodiment. In the first embodiment, explanation is given of a recording/playback device which uses a reflecting-type spatial light modulator and a reflecting-type optical recording medium. However, in the second embodiment, description is given of a recording/playback device which uses a transmitting-type spatial light modulator and a transmitting-type optical recording medium. Note that the point that the signal light and the reference light can be illuminated coaxially onto the optical recording medium is the same as in the first embodiment.

A light source 50, which oscillates laser light which is coherent light, is provided at this hologram recording/playback device. A beam expander 55, which is formed from lenses 52, 54, is disposed at the laser light illuminating side of the light source 50. A transmitting-type spatial light modulator 58 is disposed at the light transmitting side of the beam expander 55. The spatial light modulator 58 is connected to a personal computer 56 via a pattern generator 60.

In accordance with digital data supplied from the personal computer 56, the pattern generator 60 generates a pattern to be displayed on the spatial light modulator 58. The spatial light modulator 58 modulates incident laser light in accordance with the displayed pattern, and generates reference light and a digital image (signal light) of each page. An unillustrated polarizing plate and a Fourier transform lens 66, which illuminates the signal light and reference light onto an optical recording medium 72, are disposed in that order along the optical path at the light transmitting side of the spatial light modulator 58.

At the time of playing-back the hologram, when the reference light is illuminated onto the optical recording medium 72, the illuminated reference light is diffracted by the hologram, and the diffracted light is transmitted through the optical recording medium 72. A Fourier transform lens 74 and a light detector 76, which is structured by an image pickup element such as a CCD or a CMOS array or the like and which converts received playback light (diffracted light) into electric signals and outputs the electric signals, are disposed at the diffracted light exiting side of the optical recording medium 72. The light detector 76 is connected to the personal computer 56.

The structure of the hologram recording/playback device relating to the second embodiment differs from that of the device relating to the first embodiment, and the method of recording a hologram and the method of playing-back a hologram are different. However, the processing routine of the recording/playback processing which is executed by the personal computer 56 is similar to the routine shown in FIG. 4.

First, in step 100, it is judged whether recording processing has been selected or playback processing has been selected. If recording processing has been selected, in step 102, laser light is illuminated from the light source 50, digital data is output at a predetermined timing from the personal computer 56 and recording processing of a hologram is executed, and then the routine ends.

Here, the recording processing of a hologram will be described.

The laser light oscillated from the light source 50 is collimated into a large-diameter beam by the beam expander 55, and is illuminated onto the spatial light modulator 58. When digital data is inputted from the personal computer 56, at the pattern generator 60, a signal light pattern is generated in accordance with the supplied digital data and is combined with a reference light pattern such that a pattern to be displayed on the spatial light modulator 58 is generated. At the spatial light modulator 58, the laser light is polarization-modulated in accordance with the displayed pattern, and signal light and reference light are generated.

In the same way as in the first embodiment, the central portion of the spatial light modulator 58 is used for data display (i.e., for signal light), and the peripheral portion of the spatial light modulator 58 is used for reference light (see FIG. 5). The laser light incident on the central portion of the spatial light modulator 58 is polarization-modulated in accordance with the displayed pattern, and signal light is generated. On the other hand, the laser light incident on the peripheral portion of the spatial light modulator 58 is polarization-modulated in accordance with the displayed pattern, and reference light is generated. Thereafter, the signal light and the reference light are transmitted through the unillustrated polarizing plate, and are converted into an amplitude distribution.

The signal light and the reference light which are generated at the spatial light modulator 58 are Fourier transformed by the lens 66, and are simultaneously and coaxially illuminated onto the optical recording medium 72. In this way, the signal light and the reference light interfere within the optical recording medium 72, and the interference pattern is recorded as a hologram.

If playback processing is selected in step 100 of FIG. 4, in step 104, laser light is illuminated from the light source 50, and acquisition processing of the first playback image is executed.

In the acquisition processing of the first playback image, as shown in FIG. 6A, a light-blocking pattern (the entirety of which is black pixels) is displayed at the central portion of the spatial light modulator 58, and a reference light pattern, which is the same as at the time of recording, is displayed at the peripheral portion of the spatial light modulator 58. In this way, only the laser light incident on the peripheral portion of the spatial light modulator 58 is polarization-modulated, and reference light is generated, and is converted into an amplitude distribution by the unillustrated polarizing plate. Thereafter, only the reference light is, via the lens 66, illuminated onto the region of the optical recording medium 72 where the hologram is recorded.

The illuminated reference light is diffracted by the hologram, and the diffracted light is transmitted through the optical recording medium 72 and exits. The diffracted light which has exited is inverse Fourier transformed by the lens 74, and is incident on the light detector 76. The playback image can be observed at the focal plane of the lens 74. The first playback image is a positive image which is the same as the original light-and-dark image.

This playback image (first playback image) is detected by the light detector 76. The detected analog data is A/D converted by the light detector 76, and the image data of the first playback image is inputted to the personal computer 56 and held in a RAM (not shown).

Next, in step 106 of FIG. 4, a luminance value of the display image, which is for adding a dc component to the played-back diffracted light, is computed. Laser light is illuminated from the light source 50 and the computed luminance value is outputted from the personal computer 56 at a predetermined timing, and acquisition processing of the second playback image is carried out.

In the acquisition processing of the second playback image, as shown in FIG. 6B, a transmission pattern (pixels of the same luminance other than those whose luminance is 0) is displayed at the central portion of the spatial light modulator 58, and a reference light pattern, which is the same as at the time of recording, is displayed at the peripheral portion of the spatial light modulator 58. In this way, the laser light incident on the central portion of the spatial light modulator 58 is transmitted through, and a dc component of the signal light is generated. On the other hand, the laser light incident on the peripheral portion of the spatial light modulator 58 is polarization-modulated in accordance with the displayed pattern, and reference light is generated. After being transmitted through the unillustrated polarizing plate and converted into amplitude distributions, the generated reference light and dc component of the signal light are illuminated, via the lens 66, onto the region of the optical recording medium 72 where the hologram is recorded.

The illuminated reference light is diffracted by the hologram, and the diffracted light is transmitted through the optical recording medium 72 and exits. The dc component of the illuminated signal light is transmitted through the optical recording medium 72. The dc component of the signal light and the diffracted light, which have been transmitted through, are inverse Fourier transformed by the lens 74, and are incident on the light detector 76. The playback image can be observed at the focal plane of the lens 74.

This playback image (second playback image) is detected by the light detector 76. The detected analog data is A/D converted by the light detector 76, and the image data of the second playback image is inputted to the personal computer 56 and held in the RAM (not shown). The second playback image is a negative image of the original light-and-dark image.

In step 106 of FIG. 4, when acquisition processing of the second playback image is finished, the routine moves on to subsequent step 108. The image data of the first playback image and the image data of the second playback image, which are held in the RAM, are read-out, the image data of the second playback image is subtracted from the image data of the first playback image, and the difference in luminance is computed for each pixel of the digital image (signal light). Because the second playback image is a reversal image of the first playback image, in the image after the subtracting processing, the contrast is enhanced more than in the first playback image and the second playback image.

Next, in step 110, the code of each pixel is judged from the positive/negative sign of the computed difference, the digital data is decoded, and the routine ends. In this way, the digital data held by the signal light can be decoded accurately.

As described above, in the present embodiment, a positive image is acquired from diffracted light diffracted by a recorded hologram, a negative image is acquired from combined light which combines the dc component of the Fourier transform image of the signal light with this diffracted light, and the image data of the negative image is subtracted from the image data of the positive image. Therefore, in the image after the subtracting processing, the contrast is enhanced more than in the positive image and the negative image. Accordingly, if the difference in luminance is computed for each pixel of the light-and-dark image by subtracting processing, the positive/negative sign of the difference is clear, the code of each pixel can be accurately judged from the positive/negative sign of the computed difference, and the digital data can be played-back accurately.

Further, because the noise included in the image data is cancelled in the difference computing process, the digital data can be played-back accurately.

Moreover, in accordance with the above-described coding method, one bit can be expressed by one pixel. Therefore, high recording density can be realized.

In addition, the image after the subtracting processing can also be applied to methods other than the above-described coding method, by utilizing the advantages thereof that the noise is cancelled and the contrast is improved.

An experiment verifying the principles of the present invention was carried out by using the optical system shown in FIG. 7.

A laser light source of a wavelength of 532 nm was used as the light source 50, and lenses having focal lengths of 10 mm were used as the Fourier transform lenses 66, 74. A liquid crystal panel having 1024×768 pixels (256 gradations) was used as the spatial light modulator 58. A CMOS image sensor, which received one pixel of the spatial light modulator 58 by 3×3 pixels, was used as the light detector 76.

The data image used in the experiment was prepared as follows. First, digital data "0, 1" were respectively expressed as continuous pixels which were black-white pixels, white-black pixels (black pixel: luminance is 0; white pixel: luminance is 255). In this coding method, the luminance of the pixel at the right side was subtracted from the luminance of the pixel at the left side, and the value thereof was judged to be "1" when positive and "0" when negative. Further, the region of the signal light pattern was made to be 480×480 pixels. The region of the reference light pattern, which was at the periphery of the signal light pattern, was a, random image.

By using this data image, the signal light and reference light were Fourier transformed, and the Fourier transform image of the signal light was recorded on the optical recording medium 72 as an intensity-modulated hologram.

Figure 2C:
FIG. 2C is a graph showing result of a computer experiment.

Next, playback of the positive image was carried out. Only the reference light pattern used at the time of recording was displayed on the spatial light modulator 58, and the transmitted light from the region of the signal light pattern was not illuminated on the hologram. The read-out light generated in this way was illuminated onto the hologram, the playback image was detected at the light detector 76, and evaluation was carried out. A portion of the playback image is shown in FIG. 2A, and the histogram thereof is shown in FIG. 2B. The horizontal axis of the histogram shows gradation, and the vertical axis thereof shows frequencies of the pixels. ● plot the digital data "0", and ○ plot the digital data "1".

Next, playback of the negative image was carried out. The reference light pattern used at the time of recording was displayed on the spatial light modulator 58. Further, an image, in which the luminance of all of the pixels was 150, was displayed at the region of the signal light pattern. A portion of the playback image generated in this way and the histogram are shown in FIGS. 2C and 2D, respectively.

Figure 2E:
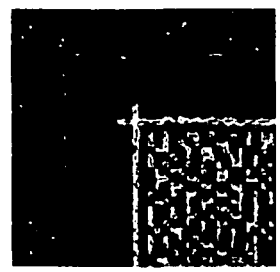
FIG. 2E is a graph showing result of a computer experiment.
Figure 2B:
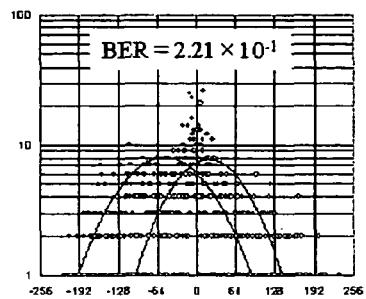
FIG. 2B is a graph showing result of a computer experiment.
Figure 2D:
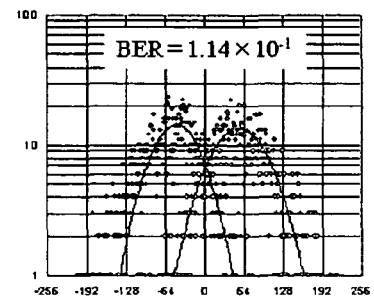
FIG. 2D is a graph showing result of a computer experiment.
Figure 2F:
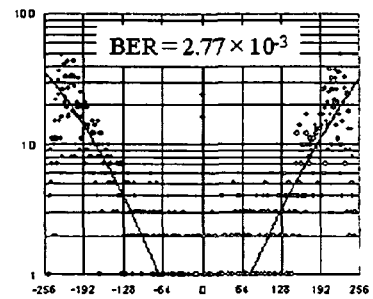
FIG. 2F is a graph showing result of a computer experiment.

An image, which was generated by subtracting the above-described negative image from the above-described positive image, and the histogram are shown in FIGS. 2E and 2F, respectively. It can be understood that the signal light pattern of FIG. 2E has improved contrast over FIG. 2A and FIG. 2C. Moreover, it can be understood that the BER (bit error rate) determined from the histogram is lower by two orders of magnitude and is improved.

As can be understood from these experimental results, a positive image is obtained in a case in which no 0-order component is added (FIG. 2A), and a negative image is obtained in a case in which a 0-order component is added (FIG. 2C). In a case in which a negative image is subtracted from a positive image (FIG. 2E), the distributions of the digital data "0" and "1" are greatly separated, and the BER is small. Namely, by adding a 0-order component, the luminance distribution of the playback image from a hologram can be controlled. By using positive and negative playback images and carrying out subtraction processing on the luminances thereof, digital data can be played-back accurately.

Note that the above embodiments describe examples in which the difference in luminance is computed by subtracting the image data of the second playback image from the image data of the first playback image. However, the difference in the luminances may be computed by subtracting the image data of the first playback image from the image data of the second playback image. It is preferable that the difference in the luminances be computed by subtracting the image data of the negative image from the image data of the positive image. The efficiency of removing noise is improved by subtracting the image data of the negative image from the image data of the positive image.

Further, the above embodiments describe examples in which the signal light and the reference light are illuminated coaxially onto the optical recording medium. However, the present invention can also be applied to the recording method of a two light wave optical system (off-axial configuration such as angular multiplexing) in which signal light and reference light are not illuminated coaxially onto a recording medium.

Further, various modifications of the above described embodiments may be possible as below.

For example, the method of the first aspect of the invention may further include decoding the digital data by judging a code of each pixel from a positive/negative sign of the computed difference.

In the method of the first aspect of the invention, the diffracted light and the dc component may be combined such that contrast of the combined light increases.

In the method of the first aspect of the invention, given that, in an inverse Fourier transform plane, an amplitude of a dc component of the diffracted light is A1, an amplitude of a dc component added at a time of playback is A2, and a phase difference between the added dc component and the dc component of the diffracted light is $\Delta\phi$, A1, A2 and $\Delta\phi$ satisfy following relational formulas (1) and (2).

$$A1 + A2 \cos(\Delta\phi) < 0 \quad \text{formula (1)}$$

$$A1 < A2 \quad \text{formula (2)}$$

In the method of the first aspect of the invention, in a case in which 1 of the digital data may be made to correspond to a light portion and 0 is made to correspond to a dark portion, a code of a pixel whose computed difference is positive is judged to be 1, and a code of a pixel whose computed different is negative is judged to be 0.

In the method of the first aspect of the invention, the difference in luminance may be computed by carrying out computing processing of image data of a negative image from image data of a positive image.

In the method of the first aspect of the invention, the dc component of a predetermined phase may be generated by phase-modulating collimated light by a spatial light modulator.

In the method of the first aspect of the invention, the collimated light may be phase-modulated by changing luminances of pixels displayed at the spatial light modulator.

Further, an second aspect of the invention provides a data playback device including: a first image data acquiring section acquiring first image data by illuminating reference light for reading onto an optical recording medium on which a hologram has been recorded by Fourier transforming and simultaneously illuminating reference light and signal light expressing digital data as a light-and-dark image, and detecting an inverse Fourier transform image of diffracted light which is diffracted by the recorded hologram; a second image data acquiring section acquiring second image data by generating combined light by combining the diffracted light and a dc component whose phase is different than a phase of a dc component of the signal light included in the diffracted light, and detecting an inverse Fourier transform image of the combined light; and a difference computing section computing a difference in luminance for each pixel of the light-and-dark image by carrying out computing processing by using the first image data and the second image data.

In addition, the data playback device may further include a decoding section decoding the digital data by judging a code of each pixel from a positive/negative sign of the computed difference of the light-and-dark image.

What is claimed is:

1. A data playback method comprising:
acquiring first image data by illuminating reference light for reading onto an optical recording medium on which a hologram has been recorded by Fourier transforming and simultaneously illuminating reference light and signal light expressing digital data as a light-and-dark image, and detecting an inverse Fourier transform image of diffracted light which is diffracted by the recorded hologram;
acquiring second image data, which is a reversal image of the first image data, by generating combined light by combining the diffracted light and a DC component whose phase is different than a phase of a DC component of the signal light included in the diffracted light, and detecting an inverse Fourier transform image of the combined light; and
computing a difference in luminance for each pixel of the light-and-dark image, by carrying out computing processing by using the first image data and the second image data.

2. The data playback method of claim 1, further comprising decoding the digital data by judging a code of each pixel from a positive/negative sign of the computed difference.

3. The data playback method of claim 2, wherein the diffracted light and the DC component are combined such that contrast of the combined light increases.

4. The data playback method of claim 3, wherein, given that, in an inverse Fourier transform plane, an amplitude of a DC component of the diffracted light is A1, an amplitude of a DC component added at a time of playback is A2, and a phase difference between the added DC component and added DC component of the diffracted light is $\Delta\phi$, A1, A2 and $\Delta\phi$ satisfy following relational formulas (1) and (2):

$$A1 + A2 \cos(\Delta\phi) < 0 \qquad \text{formula (1)}$$

$$A1 < A2 \qquad \text{formula (2).}$$

5. The data playback method of claim 2, wherein, given that, in an inverse Fourier transform plane, an amplitude of a DC component of the diffracted light is A1, an amplitude of a DC component added at a time of playback is A2, and a phase difference between the added DC component and the DC component of the diffracted light is $\Delta\phi$, A1, A2 and $\Delta\phi$ satisfy following relational formulas (1) and (2):

$$A1 + A2 \cos(\Delta\phi) < 0 \qquad \text{formula (1)}$$

$$A1 < A2 \qquad \text{formula (2).}$$

6. The data playback method of claim 1, wherein the diffracted light and the DC component are combined such that contrast of the combined light increases.

7. The data playback method of claim 6, wherein, given that, in an inverse Fourier transform plane, an amplitude of a DC component of the diffracted light is A1, an amplitude of a DC component added at a time of playback is A2, and a phase difference between the added DC component and the DC component of the diffracted light is $\Delta\phi$, A1, A2 and $\Delta\phi$ satisfy following relational formulas (1) and (2):

$$A1 + A2 \cos(\Delta\phi) < 0 \qquad \text{formula (1)}$$

$$A1 < A2 \qquad \text{formula (2).}$$

8. The data playback method of claim 1, wherein, given that, in an inverse Fourier transform plane, an amplitude of a DC component of the diffracted light is A1, an amplitude of the DC component added at a time of playback, whose phase is different than the phase of a DC component of the signal light included in the diffracted light, is A2, and a phase difference between the added DC component and the DC component of the diffracted light is $\Delta\phi$, A1, A2 and $\Delta\phi$ satisfy following relational formulas (1) and (2):

$$A1 + A2 \cos(4) < 0 \qquad \text{formula (1)}$$

$$A1 < A2 \qquad \text{formula (2).}$$

9. The data playback method of claim 1, wherein, in a case in which "1" of the digital data is made to correspond to a light portion and "0" is made to correspond to a dark portion, a code of a pixel whose computed difference is positive is judged to be "1," and a code of a pixel whose computed different is negative is judged to be "0".

10. The data playback method of claim 1, wherein the difference in luminance is computed by carrying out computing processing of image data of a negative image from image data of a positive image.

11. The data playback method of claim 1, wherein the DC component of a predetermined phase is generated by phase-modulating collimated light by a spatial light modulator.

12. The data playback method of claim 11, wherein the collimated light is phase-modulated by changing luminances of pixels displayed at the spatial light modulator.

13. A data playback device comprising:
a first image data acquiring section acquiring first image data by illuminating reference light for reading onto an optical recording medium on which a hologram has been recorded by Fourier transforming and simultaneously illuminating reference light and signal light expressing digital data as a light-and-dark image, and detecting an inverse Fourier transform image of diffracted light which is diffracted by the recorded hologram;

a second image data acquiring section acquiring second image data by generating combined light by combining the diffracted light and a DC component whose phase is different than a phase of a DC component of the signal light included in the diffracted light, and detecting an inverse Fourier transform image of the combined light; and a difference computing section computing a difference in luminance for each pixel of the light-and-dark image by carrying out computing processing by using the first image data and the second image data.

14. The data playback device of claim 13, further comprising a decoding section decoding the digital data by judging a code of each pixel from a positive/negative sign of the computed difference of the light-and-dark image.

* * * * *